United States Patent [19]

Hoover

[11] Patent Number: 4,996,789
[45] Date of Patent: Mar. 5, 1991

[54] MECHANICALLY ASSISTED FISHING APPARATUS AND TECHNIQUE

[76] Inventor: Harold C. Hoover, 204 S. Market St., North Manchester, Ind. 46962

[21] Appl. No.: 367,054

[22] Filed: Jun. 16, 1989

[51] Int. Cl.⁵ ...................... A01K 87/00; A01K 87/04
[52] U.S. Cl. ......................................... 43/24; 43/15; 43/16
[58] Field of Search ...................... 43/15, 16, 18.1, 24

[56] References Cited

U.S. PATENT DOCUMENTS

| | | | |
|---|---|---|---|
| 1,475,408 | 11/1923 | Reed | 43/15 |
| 2,303,668 | 12/1942 | Tilbury | 43/15 |
| 2,549,295 | 4/1951 | Derby | 43/16 |
| 2,657,493 | 11/1953 | Coles | 43/16 |
| 2,658,299 | 11/1953 | Maxfield | 43/15 |
| 2,824,404 | 2/1958 | Booth | 43/15 |
| 2,934,847 | 5/1960 | Duff | 43/15 |
| 3,143,822 | 8/1964 | Schooley | 43/24 |
| 4,027,419 | 6/1977 | Popeil | 43/18.1 |

*Primary Examiner*—Kurt Rowan
*Attorney, Agent, or Firm*—Roger M. Rickert

[57] ABSTRACT

A fishing arrangement and technique are disclosed and include a relatively short fishing pole having a handgrip portion near one end thereof and a bifurcated tip near the other end. The bifurcated tip includes first and second cantilevered portions which diverge from one another and have corresponding first and second tip line guide eyelets near their respective free ends. A trigger actuable spring biased fishing reel fastened to the pole adjacent the handgrip portion provides pretorqued mechanical assistance in setting a hook in the mouth of a fish. A fishing line extends from the reel, through a series of line guide eyelets, through the first tip line guide eyelet and then through the second tip line guide eyelet, and ultimately terminates at a baited fishhook. The first cantilevered portion is significantly more flexible than the second cantilevered portion so as to function as an indicator by being deflected toward the second cantilevered portion in response to an increase in line tension. The first cantilevered portion may include a highly visible indicia near the free end thereof for aiding a user in observing deflection. Fish are caught in accordance with the invention by observing a manifestation of fishing line tension at the tip end of a fishing pole, such as the extent to which the two tips are drawn together, and, upon observing an increase in the line tension indicative of a fish having taken a baited hook into its mouth, a preset spring bias is triggered to further significantly increase the line tension and set the hook in the fish's mouth.

1 Claim, 1 Drawing Sheet

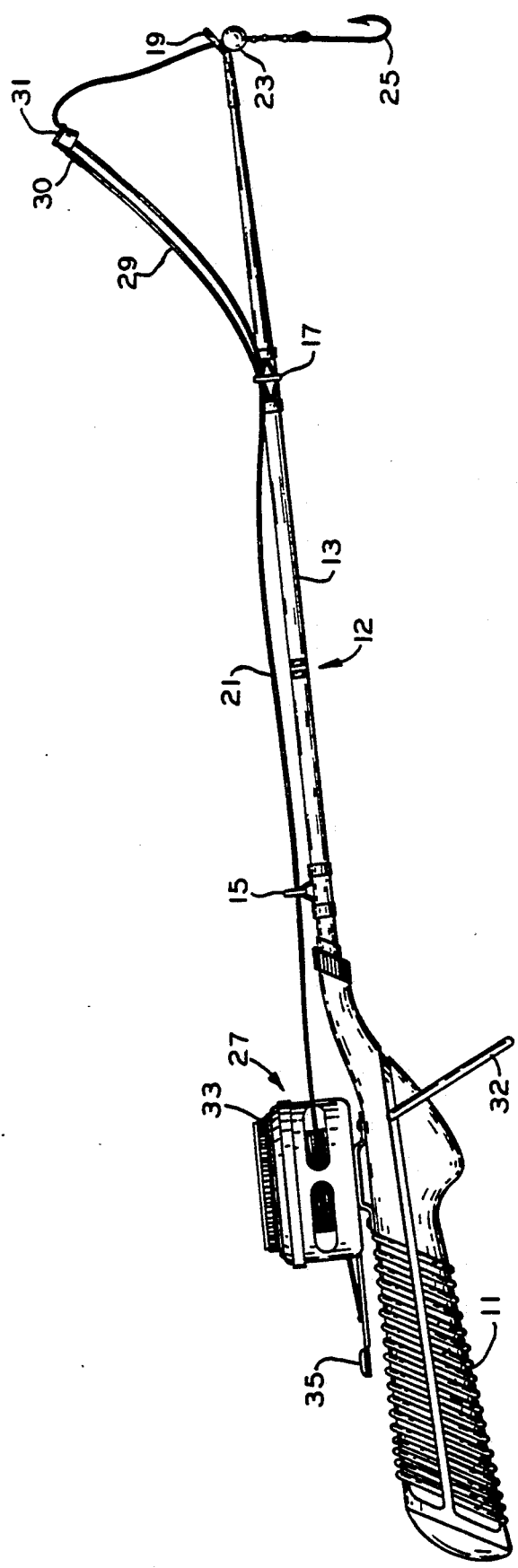
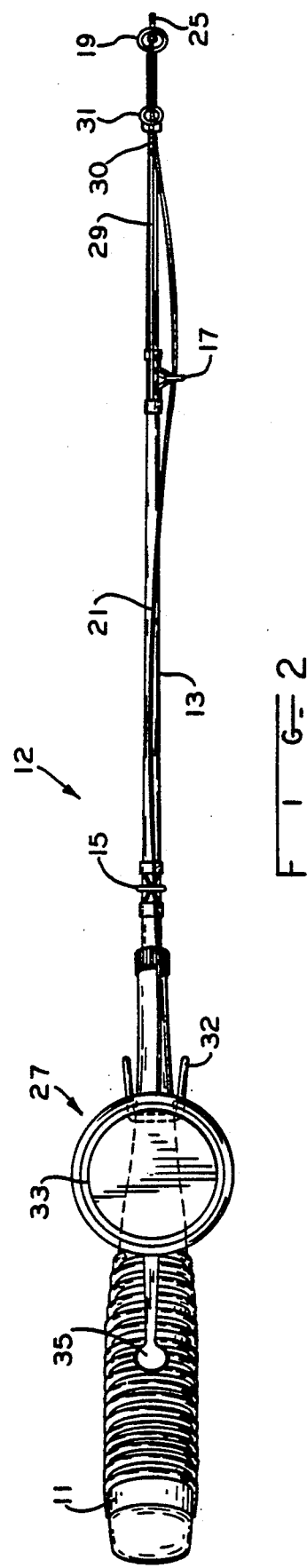

MECHANICALLY ASSISTED FISHING APPARATUS AND TECHNIQUE

SUMMARY OF THE INVENTION

The present invention relates generally to the sport of fishing and more particularly to a fishing rod and reel combination and technique of using the combination to achieve enhanced catches.

The time-honored technique for still fishing is to suspend a baited hook from a bobber and wait until a fish pulls on the line causing the bobber to descend in or disappear beneath the surface of the water at which time the hook is "set" in the fish's mouth by a quick upward jerk of the fishing pole to pull on the line.

There have been various attempts over the years to eliminate the bobber from the tackle box. For example, in U.S. Pat. No. 3,143,822 there is disclosed, in an otherwise conventional rod and reel combination, a signaling arrangement employing a second flexible rod tip which is bent toward the usual rod tip when a pull is exerted on the line. A number of "tip-up" arrangements for unattended ice fishing have also been suggested.

In conventional still fishing as well as bait casting or fly fishing, the hook is "set" in the fish's mouth by a quick upward jerk of the rod to pull on the line. All too often this jerk on the line is either too gentle to set the hook or is to abrupt and pulls the bait or lure from the fish's mouth too quickly and without actually hooking the fish.

Numerous mechanical devices for exerting the correct pull back on the line at the proper time have been devised, but few have found their way into common use. U.S. Pat. Nos. 2,657,493; 2,931,121; and 3,605,314 all show spring-loaded devices which are automatically triggered by a tug on the line to pull back with a greater force and set the hook in the fish's mouth. Each of these patented devices is automatically triggered requiring no decision or skill on the part of the fisherman which may in part explain their lack of commercial success. Fishing is, after all, a sport.

Among the several objects of the present invention may be noted the provision of a spring-loaded arrangement for initially setting the hook in the mouth of a fish and thereafter for maintaining at least a desired minimum tension on the line until the fish is successfully landed; the provision of a device for mechanically assisting (without replacing) the fisherman in setting the hook in the mouth of a fish; the provision of a pretorqued fishing reel which may be triggered upon occurrence of a predetermined indication; the provision of a fishing rod which employs relative motion between the two portions of a bifurcated rod tip as an indication of a "bite"; the provision of a fishing technique which utilizes the advantages of automatic fishing arrangements while retaining the human element of sport fishing; the provision of a method of catching a fish which combines the observation of a manifestation of fishing line tension at the tip end of a fishing pole with the fisherman's response of manually triggering a preset spring bias upon an increase in that line tension to further significantly increase the line tension and set the hook in the mouth of a fish; and the provision of a method of and apparatus for still fishing which eliminates both the conventional bobber and the familiar jerk on the fishing pole in response to an indication of a "nibble" or "bite". These as well as other objects and advantageous features of the present invention will be in part apparent and in part pointed out hereinafter.

In general, the method of catching a fish includes the provision of a triggerable spring-loaded reel of taking up fish line when triggered. Fish line is passed from the reel through a line retaining eyelet of a highly flexible tip section of a short fishing pole and that fishing line is terminated at a baited hook suspended from the highly flexible tip section of the pole. The baited hook is immersed in water and the reel is manually triggered to retract and increase the tension on the fish line upon observing deflection of the highly flexible tip section indicative of a fish having taken the baited hook into its mouth. The fish line may be passed through a line retaining eyelet of a more rigid tip section of the short fishing pole after passing through the highly flexible tip section and prior to terminating at the baited hook in which case, the flexible tip section will be drawn adjacent to the more rigid tip section upon triggering of the reel.

Also in general and in one form of the invention, a manual fishing arrangement includes a relatively short hand-held fishing pole having a handgrip portion near one end thereof and a bifurcated tip near the other end. The bifurcated tip has first and second cantilevered portions diverging from one another and having corresponding first and second tip line guide eyelets near the free ends thereof. A trigger actuable spring biased fishing reel for providing pretorqued mechanical assistance in setting a hook in the mouth of a fish is fastened to the pole adjacent the handgrip portion with the trigger extending from the reel toward the handgrip portion. A series of line guide eyelets are positioned periodically along a portion of the pole between the reel and the bifurcated tip A fishing line is wound about the reel and extends therefrom through the series of line guide eyelets, through the first tip line guide eyelet and then through the second tip line guide eyelet, and terminates at a baited fishhook. The first cantilevered portion is significantly more flexible than the second cantilevered portion and is deflected toward the second portion upon an increase in the tension in the fishing line. The first cantilevered portion functions as an indicator and is a substitute for the conventional bobber. It may include a highly visible indicia near the free end thereof for aiding the user in observing deflection.

Still further in general, upon a visual indication of a nibble on a bait, a trigger is actuated to mechanically apply a preferred tension to a fishing line. In a preferred form, the visual indication is provided by the drawing together of the two tips of a bifurcated fishing pole and the preferred tension is provided by a spring biased reel.

BRIEF DESCRIPTION OF THE DRAWING

FIG. 1 is a side elevation view of a fishing rod and reel incorporating my invention in one form; and FIG. 2 is a top plan view of the rod and reel of FIG. 1.

Corresponding reference characters indicate corresponding parts throughout the several view of the drawing.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Referring now more particularly to the combined fishing rod 12 and reel 27 as shown in FIGS. 1 and 2, the rod 12 includes a hand grip portion 11 joined to a flexible fiberglass shaft portion 13. The end of the rod 12 opposite the handgrip portion 11 has a bifurcated tip including first and second cantilevered portions diverging from one another and having corresponding first and second tip line guide eyelets 19 and 31 near the free ends. There are several line guide eyelets such as 15, 17 and 19 fastened to the shaft 13 through which fishing line 21 passes. One end of the line 21 is fastened to a conventional sinker 23 and fish hook 25 and the other end of the line 21 terminates within take-up reel 27.

The reel 27 may be a conventional fly fishing reel of the type having spring loaded line take-up. The spring, typically a multiple turn leaf spring, is wound by turning the large knurled rim 33 and the tension from that spring is transferred to the line take-up reel by depressing lever 35 to take up excess line. When mounted on pole 12, the lever or trigger 35 extending from the reel 27 toward the handgrip portion 11 of the pole. In its normal use during fly casting, this reel functions only to take up excess line or to pay out additional line during the fishing process.

The eyelet 17 is skewed about ninety degrees about the axis of the rod and extends laterally from the shaft portion 13. This is to displace line 21 to the side and around the upwardly angled rod tip portion 29 and into tip portion eyelet 31. Eyelet 15 may be similarly skewed if desired. The tip portion 29 is much more flexible than the tip of the shaft 13 and not sufficiently strong to land a fish without the support of the free end of shaft portion 13. The first cantilevered portion 29 includes highly visible indicia 30 in any of several forms near the free end thereof for aiding the user in observing deflection. Thus, the end of tip portion 29 may be painted with a fluorescent paint or otherwise made highly visible so that a slight tug on hook 25 by a fish will flex the tip portion 29 toward the end of the shaft portion 13 as a substitute for a bobber to alert the fisherman.

In conventional still fishing as well as bait casting or fly fishing, the hook is "set" in the fish's mouth by a quick upward twist of the rod to pull on the line. With the present invention, line is payed out by simply pulling the line from the reel. The fisherman watches the tip 29 and when that tip begins to bend toward the main portion of the shaft 13 indicating a "nibble", the fisherman depresses lever 35 allowing the spring of reel 27 to provide the right amount of pull on the line to set the hook. Thereafter, this spring tension on the line will help in landing the fish, that is, the spring bias maintains the line tension drawing the fish toward the pole.

The rod 12 is designed for still fishing without a bobber directly downwardly from the side of a boat or off a pier as opposed to bait casting or fly fishing. Hence, it is short; only 26 inches in length as compared to perhaps 5 or 6 feet for a bait casting rod and even longer fly rods. A bipod rest 32 may be provided in the form of a pair of legs which pivot together between an extended position as shown and a retracted position closely adjacent the handgrip 11. The bipod rest when extended allows the rod to be temporarily set down and yet be maintained in its normal fishing attitude with the reel 27 on top and the tip end raised.

The method of catching a fish in accordance with the present invention should now be easily understood. A relatively short rod or pole 12 and a triggerable spring-loaded reel 27 for taking up fish line 21 upon triggering thereof are provided. The fish line 21 is passed from the reel 27 through a series of line retaining eyelets such as 15 and 17 along the pole and through a line retaining eyelet 31 of a highly flexible tip section 29 of the short fishing pole and terminates at a baited hook 25 suspended from the highly flexible tip section of the pole. The baited hook is immersed in water and the reel manually triggered at the appropriate time by depressing trigger 35 to retract and increase the tension on the fish line. The appropriate time is upon observing deflection of the highly flexible tip section indicative of a fish having taken the baited hook into its mouth. The fish line 21 is also passed through a line retaining eyelet 19 of a more rigid tip section of the short fishing pole after passing the fish line through the eyelet 31 of the highly flexible tip section and prior to terminating at the baited hook. As thus rigged, the flexible tip section 29 will be drawn downward and adjacent to the more rigid tip section upon triggering of the reel.

From the forgoing, it is now apparent that a novel fishing arrangement and technique has been disclosed meeting the objects and advantageous features set out hereinbefore as well as others, and that numerous modifications as to the precise shapes, configurations and details may be made by those having ordinary skill in the art without departing from the spirit of the invention or the scope thereof as set out by the claims which follow.

What is claimed is:

1. A manual fishing arrangement including:

a relatively short hand-held fishing pole having a handgrip portion near one end thereof and a bifurcated tip near the other end thereof, the bifurcated tip including first and second cantilevered portions diverging from one another and having corresponding first and second tip line guide eyelets near the free ends thereof;

the first cantilevered portion including highly visible indicia near the free end thereof for aiding the user in observing deflection;

a trigger actuable spring biased fishing reel fastened to the pole adjacent the handgrip portion thereof and having a trigger extending from the reel toward the handgrip portion of the pole;

a series of line guide eyelets along a portion of the old between the reel and the bifurcated tip, one of said line guide eyelets skewed about 90 degrees to the line guide eyelet adjacent the reel and located at the junction of said cantilevered portions; and a fishing line would about said reel and extending therefrom through the series of line guide eyelets, through the first tip line guide eyelet and then through the second tip line guide eyelet, and terminating at a baited fishhook;

the first cantilevered portion being significantly more flexible than the second cantilevered portion so as to be deflected toward the second cantilevered portion upon an increase in the tension in the fishing line whereby a user may trigger the spring biased reel upon an observed deflection and corresponding increase in the line tension indicative of a fish having taken a baited hook into its mouth to further significantly increase the line tension, set the hook in the mouth of the fish and draw the fish toward the pole.

* * * * *